(12) United States Patent
Herding et al.

(10) Patent No.: US 9,517,427 B2
(45) Date of Patent: Dec. 13, 2016

(54) FILTER DEVICE AND FILTER METHOD

(75) Inventors: Urs Herding, Amberg (DE); Stefan Hajek, Amberg (DE)

(73) Assignee: Herding GMBH Filtertechnik, Amberg (DE)

( * ) Notice: Subject to any disclaimer, the term of this patent is extended or adjusted under 35 U.S.C. 154(b) by 170 days.

(21) Appl. No.: 13/821,921

(22) PCT Filed: Sep. 5, 2011

(86) PCT No.: PCT/EP2011/065286
§ 371 (c)(1),
(2), (4) Date: Jun. 21, 2013

(87) PCT Pub. No.: WO2012/032003
PCT Pub. Date: Mar. 15, 2012

(65) Prior Publication Data
US 2013/0259758 A1  Oct. 3, 2013

(30) Foreign Application Priority Data
Sep. 10, 2010 (DE) .......... 10 2010 045 000

(51) Int. Cl.
| | |
|---|---|
| B01D 46/04 | (2006.01) |
| B01D 46/24 | (2006.01) |
| B01D 46/00 | (2006.01) |
| B01D 46/38 | (2006.01) |
| B01D 50/00 | (2006.01) |
| B05B 15/12 | (2006.01) |

(52) U.S. Cl.
CPC ....... *B01D 46/0067* (2013.01); *B01D 46/0041* (2013.01); *B01D 46/0068* (2013.01); *B01D 46/38* (2013.01); *B01D 50/002* (2013.01); *B05B 15/1251* (2013.01); *B01D 2273/12* (2013.01); *Y02P 70/36* (2015.11)

(58) Field of Classification Search
CPC ..... B01D 46/04; B01D 46/24; B01D 46/0068; B01D 46/4272; B01D 46/4281
USPC .... 55/283, 302, 284, 293, 295, 296; 95/280; 96/426, 427
See application file for complete search history.

(56) References Cited

U.S. PATENT DOCUMENTS

| | | | |
|---|---|---|---|
| 3,577,705 A * | 5/1971 | Sharlit | 95/2 |
| 3,606,736 A * | 9/1971 | Leliaert et al. | 55/302 |
| 3,733,784 A * | 5/1973 | Anderson et al. | 96/43 |

(Continued)

FOREIGN PATENT DOCUMENTS

| | | |
|---|---|---|
| DE | 199 38 903 A1 | 2/2001 |
| DE | 199 38 772 A1 | 3/2001 |
| EP | 1 270 060 A1 | 1/2003 |

*Primary Examiner* — Jacob T Minskey
*Assistant Examiner* — Minh-Chau Pham
(74) *Attorney, Agent, or Firm* — Blank Rome LLP (57) ABSTRACT

A filter device is proposed for cleaning gas entraining foreign bodies, including at least one filter unit having at least one filter surface on a raw gas side to which a raw gas stream containing foreign bodies can be supplied, wherein filtration aids can be supplied to the raw gas stream and/or the filter surface, and wherein filtration aids and/or foreign matter attached to the filter surface can be cleaned off. The filter device additionally includes a fluidized bed arrangement in which a carrier fluid stream can be generated such that cleaned-off filtration aids and/or foreign matter can be held at least in part as filtration aerosol in a surrounding of the filter unit and/or can re-attach to a filter surface.

27 Claims, 2 Drawing S (56) References Cited**

U.S. PATENT DOCUMENTS

| | | | | | |
|---|---|---|---|---|---|
| 3,880,968 | A | * | 4/1975 | Kaspar et al. | 264/37.29 |
| 4,161,389 | A | * | 7/1979 | Staffin et al. | 432/58 |
| 4,245,551 | A | * | 1/1981 | Berkmann | 454/53 |
| 4,261,713 | A | * | 4/1981 | Bourdois et al. | 55/302 |
| 4,277,260 | A | * | 7/1981 | Browning | 96/426 |
| 4,378,728 | A | * | 4/1983 | Berkmann | 454/53 |
| 4,396,590 | A | * | 8/1983 | Cheng | 423/449.1 |
| 4,401,445 | A | * | 8/1983 | Browning | 95/279 |
| 4,521,231 | A | * | 6/1985 | Shilling | 55/302 |
| 4,590,039 | A | * | 5/1986 | Cheng | 422/150 |
| 4,624,689 | A | * | 11/1986 | Volk et al. | 96/397 |
| 4,645,520 | A | * | 2/1987 | Huttlin | 55/302 |
| 4,655,603 | A | * | 4/1987 | Palm | 366/107 |
| 4,671,806 | A | * | 6/1987 | Stil et al. | 95/268 |
| 4,696,683 | A | * | 9/1987 | Vitovec et al. | 95/268 |
| 4,778,488 | A | * | 10/1988 | Koers | 95/271 |
| 4,973,458 | A | * | 11/1990 | Newby et al. | 423/244.07 |
| 5,094,673 | A | * | 3/1992 | Kilicaslan et al. | 55/302 |
| 5,178,652 | A | * | 1/1993 | Huttlin | 95/279 |
| 5,198,002 | A | * | 3/1993 | Mei et al. | 95/275 |
| 5,591,240 | A | * | 1/1997 | Ophardt et al. | 96/407 |
| 5,846,300 | A | * | 12/1998 | Johnson | 95/280 |
| 5,868,807 | A | * | 2/1999 | Luy et al. | 55/302 |
| 6,451,091 | B1 | * | 9/2002 | Avina | 95/107 |
| 7,479,170 | B1 | * | 1/2009 | Collette | 55/302 |
| 7,972,399 | B2 | * | 7/2011 | Ahman et al. | 55/341.6 |
| 8,277,526 | B2 | * | 10/2012 | Cho | 55/294 |
| 2013/0133298 | A1 | * | 5/2013 | Troxell et al. | 55/283 |

* cited by examiner

FILTER DEVICE AND FILTER METHOD

CROSS-REFERENCE TO RELATED APPLICATIONS

This application is the national stage entry under 35 U.S.C. 371 of PCT/EP2011/065286, filed on Sep. 5, 2011, which claims the benefit of the Sep. 10, 2010 priority date of German application DE 10 2010 045 000.6.

FIELD OF THE INVENTION

Background

The present invention relates to a filter device for cleaning gas entraining foreign matter or bodies, in particular to a filter device employing dry filtration, as well as to a corresponding method for filtering gas entraining foreign matter or bodies.

Filter devices employing dry filtration are used in a variety of applications for cleaning exhaust air or other exhaust gases (in the following generally referred to as exhaust air) arising in installations in a wide range of industries. A very specific advantage of dry filters over wet filter devices, e.g. rinsing systems, is the relatively simple processing of the filtered-out foreign bodies arising, as these do not arise bound in liquid phases.

However, there are problems present when there are foreign bodies contained in exhaust air that are of sticky nature. This is the case, for example, when the exhaust air contains tarry dusts, or in the case of exhaust air from painting/varnishing facilities, especially wet painting/varnishing facilities. The reason therefor is that such sticky foreign bodies preferentially settle in the pores of the filter, gradually clogging the same. Due to their sticky nature, they tightly attach to the filter surface and thus can no longer be removed from the filter surface by use of cleaning systems employing pressurized air as usually applied for dry filters. The filter thus rapidly loses its cleaning capability and has to be replaced.

It is known to add filtration aids when dry filters are used for filtering exhaust air containing foreign matter of sticky nature. This may be effected upstream of the dry filter, by injection of filtration aids in the raw gas stream fed to the dry filter. It is also possible to coat a filter surface on the raw gas side of the dry filter with filtration aids before the same is contacted with foreign bodies (so-called "precoating"). The filtration aids are intended to establish a bond with the sticky foreign bodies in the exhaust air and make sure that agglomerates made up with filtration aids and foreign bodies attach to the substrate surface, which agglomerates can be removed easily using the conventional cleaning methods. An example of the addition of filtration aids directly in the raw gas stream upstream of the dry filter is disclosed in DE 42 11 465 C2. Precoating of the filter surfaces with filtration aids is known e.g. from DE 197 15 195 A1. Moreover, in both documents there are measures provided for collecting material arising after cleaning off of the filter and for returning the same to the raw gas stream, optionally after processing thereof.

DE 199 24 130 A1 and DE 103 61 266 A1 disclose a method in which material arising after cleaning off of the filter unit is collected in a collecting container, and the collected material is stirred in the collecting container by blowing-in pressurized air, such that it re-attaches to the filter surface.

SUMMARY

It is an object of the present invention to make available an improved filter device of the type described, which in particular permits more efficient utilization of filtration aids. In addition thereto, a corresponding method for filtering gas entraining foreign bodies is to be indicated.

To meet this object, the invention suggests a filter device for cleaning gas entraining foreign bodies, as well as a corresponding method for filtering gas entraining foreign bodies, comprising: there is provided at least one filter unit having at least one filter surface on the untreated or raw gas side of the same to which raw gas side a raw gas stream containing foreign bodies can be supplied, wherein filtration aids can be supplied to the raw gas stream and/or the filter surface on the raw gas side. Filtration aids and/or foreign matter attached to the filter surface on the raw gas side can be cleaned off. In addition thereto, there is provided a fluidized bed arrangement in which a carrier fluid stream can be generated such that cleaned-off filtration aids and/or foreign matter can be held at least in part as filtration aerosol in a surrounding of the filter unit and/or can re-attach to a filter surface on the raw gas side. The term "filtration aerosol" is used here in quite general form for designating a mixture of solid and/or liquid suspended particles in the carrier fluid stream, without implying a limit of the diameter of the suspended particles. Up to which size the particles may grow before they are removed from the aerosol layer due to their gravity, is dependent mainly upon the properties of the carrier fluid stream. With a suitable adjustment of the carrier fluid stream, it is easily possible to keep particles suspended that have a diameter of more than 100 μm.

The filter surface can be cleaned off in the sense that material adhering to the filter surface can detached again from the filter surface in a cleaning-off process which as a rule is performed periodically. The time intervals as a rule will be selected in consideration of the loading of the filter surface and will be chosen such that a predetermined pressure loss across the filter stage is not exceeded.

The addition of filtration aids—examples for such filtration aids are rock flour (crushed rock of silt size) or other mineral dusts—results in the formation of agglomerates made up with filtration aids and foreign bodies attached to the same. Such agglomerates are by far less sticky than the pure foreign bodies, so that such agglomerates are considerably easier to detach from the filter surface than the pure foreign bodies. Efficient use of filter devices employing dry filters thus is successfully possible also for cleaning exhaust air containing sticky foreign bodies, as in exhaust air in wet or dry painting or varnishing facilities.

For a sufficient agglomeration of the foreign bodies with the filtration aids to take place in sufficiently rapid manner, it is expedient to add a comparatively large amount of filtration aids. This ensures in addition that the entire filter surface is coated with a layer of filtration aids, possibly with foreign bodies attached thereto, within a short period of time, thus protecting the filter surface. However, this approach means that only a smaller percentage of the added filtration aids has formed agglomerates within one single cleaning-off cycle. There are of course endeavors being made for using the auxiliary materials as efficiently as possible, i.e. to convert possibly all filtration aids added into agglomerates of filtration aids with attached foreign bodies. This has created the idea of repeatedly reusing the mixture of filtration aids and foreign bodies that results upon cleaning-off of the filter, until an as complete as possible transformation, i.e. covering of filtration aids with foreign bodies, has taken place.

The renewed supply of material removed in a cleaning-off operation to the raw gas or the filter surface, however, has turned out problematic as the material removed from the filter surface and collected on the floor or in a separate container often forms caked structures that are difficult to separate again. Even the blowing-in of pressurized air into the material collected on the floor, with the aim of stirring this material to such an extent that it attaches again to the filter surface, has only partially satisfactory results. The invention therefore suggests an up to now completely novel approach. Instead of intercepting the material removed from the filter surface in a cleaning-off operation and collecting the same in a container or on the floor of the raw gas space, this material is to be kept as close as possible to the filter surface. This permits on the one hand that this material quickly re-establishes contact with the raw gas stream and on the other hand remains in contact with the filter surface. In this manner, it is possible for further agglomerates to form, or for already present agglomerates to grow further by attachment of additional foreign bodies or other agglomerates. Moreover, it is also possible for the cleaned-off material to rapidly re-attach to the filter surface and thus provide a protective coating. The processes described can take place in virtually continuous manner. Shutting-down of the device for the purpose of cleaning-off and newly coating of the filter surface is not absolutely necessary any more.

It has turned out that it is possible to hold the material detached from the filter surface with the aid of a fluidized bed. The material forms an aerosol layer in the fluidized bed that is held "suspended" by a carrier fluid stream. In the "fluidized bed", operating in the manner of an arrangement known as swirl bed, a stream of the carrier fluid, which as a rule is directly upwardly, i.e. counter to the force of gravity, flows through the individual particles of solid phase formed of foreign bodies, filtration aids and agglomerates formed by the same, and cooperates with the same such that the individual particles are held in a fluidized state and, as it were, are "suspended". This fluidized bed arrangement can be adjusted such that the solid phase formed of foreign bodies, filtration aids and agglomerations formed by the same can establish optimum contact with additional foreign bodies entrained by the raw gas stream and thus very efficiently forms further agglomerates or causes already formed agglomerates to grow further. When the fluidized solid phase is held near the filter surface, it is moreover possible to successfully coat the same again with a protective layer within a short period of time after a cleaning-off operation.

By way of the stream of the carrier fluid it is possible to adjust which maximum mass density agglomerates of filtration aids and foreign bodies are allowed to have in order to still permit the same to be carried in fluidized form. When the agglomerates exceed this critical mass density, they gradually fall down further and finally drop out of the fluidized bed completely. Already saturated agglomerates, for which further use for having additional foreign bodies attached thereto or for coating the filter surface is no longer desirable, can thus be successfully removed from the filter device by dropping out. To the extent in which spent agglomerates drop out of the fluidized bed, unspent filtration aids can be added in continuous manner. Thus, there is no need for stopping the filter device for replacing spent filtration aids.

The fluidized bed arrangement in operation preferably forms a filtration aerosol layer of filtration aids, foreign bodies and agglomerates of filtration aids with foreign bodies attached thereto, which in vertical direction extends from a lower limit at the height of or slightly below the bottom side of the filter unit to an upper limit at the height of or slightly above the upper side of the filter unit or even still further. In an example, the filtration aerosol layer can extend up to 90 cm, preferably up to 60 cm and most preferably up to 50 cm below the bottom side of the filter unit.

As carrier fluid, there can be used in particular a carrier gas (e.g. air) that is present on the raw gas side of the filter unit. The carrier fluid may comprise the raw gas stream itself and in the simplest case can be constituted by the gas establishing the raw gas stream. In such cases, the fluidized bed arrangement preferably comprises a swirler arrangement through which an upwardly directed, preferably turbulent flow can be generated on the raw gas side, in particular in the filtration aerosol layer. The swirler arrangement is to enhance the tendency of forming vortices, that is present in the raw gas stream anyway, such that a fluidized bed forms in the filtration aerosol layer, which takes care that the filtration aerosol is kept stably held in this layer, while there is nevertheless good mixing taking place within the layer in order to be able to promote agglomeration and to efficiently form a protective coating on the filter surface, respectively.

The fluidized bed arrangement can preferably comprise a carrier fluid introduction arrangement in addition, through which the raw gas side of the filter unit can be acted upon by carrier fluid. The carrier fluid can establish the carrier fluid stream in addition to the raw gas stream. Furthermore, the carrier fluid introduction arrangement can also be designed to cause swirling of the carrier fluid introduced. Moreover, it is expedient to introduce the carrier fluid in such a manner that an upwardly directed carrier fluid stream results. An advantage of using a carrier fluid stream generated by a swirler/carrier fluid introduction arrangement consists in that the carrier fluid stream can be adjusted—e.g. by a corresponding design and/or control of the swirler/carrier fluid introduction arrangement—such that particles that are heavier than a predetermined critical mass density are no longer held suspended and drop out of the filtration aerosol layer.

The swirler/carrier fluid introduction arrangement may comprise e.g. an annular conduit arranged below the filter unit and provided with a nozzle arrangement comprising at least one—preferably several—nozzles. The annular conduit in operation may be acted upon by carrier fluid such that in operation a carrier fluid stream is formed downstream of the nozzle arrangement, which is directed towards the filter unit and acts counter to the force of gravity. As an alternative, there may be, underneath the filter unit, a fluidizing floor or base member provided with fluidizing openings (e.g. slots). This fluidizing floor is subjected to carrier fluid from its bottom side so that the carrier fluid flows through the fluidizing openings and, downstream of the fluidizing floor, forms a carrier fluid stream directed towards the filter unit and acting counter to the force of gravity.

The swirler/carrier fluid introduction arrangement can be provided as a means that is continuously in operation. When the carrier fluid introduction arrangement generates a sufficiently strong carrier fluid stream, the intensity of the carrier fluid stream can be set largely independently of the raw gas stream.

In an embodiment the filter device can comprise a housing defining at least one raw gas space facing the raw gas side of the filter unit, and having at least one raw gas inflow opening leading into the raw gas space. The raw gas stream enters the raw gas space through said raw gas inflow opening. The housing then as a rule will define a clean gas space as well, facing the clean gas side of the filter unit and having an outflow opening for filtered clean gas leading into the clean gas space.

It has turned out that, in an expedient embodiment, the raw gas inflow opening may be arranged approx. at the height of or slightly below the filter unit. This is expedient in particular when there is a carrier fluid stream from below, since this carrier fluid stream then mixes with the raw gas stream below the filter unit, entraining the foreign bodies contained therein. As the carrier fluid stream also carries the filtration aids, this provides for efficient agglomeration between filtration aids and foreign bodies.

In a further embodiment, the housing may have at least one additional inflow opening leading into the raw gas space, through which the filtration aids can be supplied. The filtration aids supplied can be pure filtration aids or filtration aids loaded with slight amounts of foreign bodies. It is expedient when the additional inflow opening is disposed as well at the height of or slightly below the filter unit. Filtration aids can be supplied through this additional inflow opening in predetermined intervals or as a continuous stream of filtration aids in order to replace material discharged from the fluidized bed. A possibly required initial coating of the filter device can be effected through the additional inflow opening as well. Optionally, this additional inflow opening can also be used for supplying slightly contaminated filtration aids arising after cleaning-off of the filter unit and branched off from the fluidized bed. The latter are filtration aids that are slightly contaminated with foreign bodies which, however, have foreign bodies attached or agglomerated thereto only to such a minor extent that still further foreign bodies can attach thereto.

As an alternative or in addition, there may also be provided a further filtration aid supply means opening into the raw gas stream upstream of the filter unit. By way of this further filtration aid supply means, there may be supplied fresh filtration aids to the raw gas stream on the one hand, but on the other hand also such filtration aids that are branched off from the fluidized bed and are slightly contaminated with foreign bodies.

In an embodiment, the inflow opening for the raw gas stream can be arranged such that the raw gas stream merges with the carrier fluid stream at an angle of approx. 90 degrees. It is particularly expedient when the raw gas stream joins the carrier fluid stream underneath the filter unit.

The filter device in addition may comprise a collecting container for non-reusable particles, which is associated with the raw gas side. Non-reusable particles are "saturated" agglomerates of filtration aids and foreign bodies that are covered or loaded with foreign bodies to such a large extent that further attachment of foreign bodies is no longer efficiently possible. Such saturated agglomerates have considerably higher mass density than the foreign bodies alone and also than filtration aids that are not or just weakly loaded with foreign bodies. Depending on the adjustment of the carrier fluid stream, it is possible to adjust a maximum mass density of particles that can still be held suspended in the fluidized bed. As soon as the agglomerates become heavier than this mass density, they will drop out of the filtration aerosol layer and can be collected in the collecting container therebelow, which preferably has a disposal opening at a lowest point through which material can be discharged from the collecting container. This can take place using e.g. a vacuum conveying means.

The collecting container can be arranged e.g. below a housing portion disposed underneath the filter unit and having a substantially funnel-shaped configuration.

For facilitating discharge of the agglomerations from the collecting container that have become unusable, the collecting container may have a fluidizing arrangement in addition, through which material in the collecting container can be acted upon by gas so that the flowability of the same is retained. In this regard, the fluidizing arrangement can be operated continuously or briefly during discharge of material collected in the collecting container.

The collecting container furthermore can have a conveying means associated therewith through which material can be withdrawn from the collecting container and supplied to the filtration aerosol layer and/or the raw gas stream upstream of the filter unit. Such a conveying means may be of assistance in particular in a restart situation of the filter device as it permits particles, which upon deactivation of the device and the accompanying inevitable breakdown of the carrier fluid stream drop from the filtration aerosol layer into the collecting container, to be withdrawn from the collecting container and be returned to the filtration aerosol layer and the raw gas stream, respectively, when the device is restarted. For, the material from the filtration aerosol layer that is located in the collecting container after deactivation of the device, as a rule will still be usable as filtration aid. Without the conveying means, this material would have to be disposed of. The conveying means can be operated pneumatically with positive pressure, e.g. in the form of a low pressure injector, with negative pressure as vacuum conveying means or in fluidized form with pressure in the manner of a solid pump, in particular a solid diaphragm pump.

Cleaning-off can be effected by a cleaning-off unit associated with the filter unit. The cleaning-off means may comprise a pressurized-air cleaning-off unit that is arranged above the filter unit on the clean gas side of the same such that the filter unit can have pressurized air applied thereto in accordance with the counterflow principle in order to remove material deposited on the filter unit on the raw gas side. When the filter unit has a plurality of filter elements, the pressurized-air cleaning-off unit can be controlled such that only part of the filter elements is cleaned off in alternating, successive manner each, so that an as uniform as possible amount of cleaned-off filtration aids/foreign bodies results that have to be kept suspended.

The filter unit preferably has at least one filter element that is in the form of a rigid-body filter.

In an embodiment, the filter element may have a base body of sintered material, preferably containing sintered polyethylene (PE) particles as main constituent. The base body can be provided with a surface coating containing polytetrafluoroethylene (PTFE) particles.

In an alternative embodiment, the filter element can be formed of an arrangement of PE bodies, in particular PE tubes, with a filter membrane of PTFE being laminated onto each of the PE bodies.

In an embodiment the housing may have at least one lateral housing opening that can be closed by a corresponding lid and is arranged at the height of the filter elements and through which the filter elements can be inserted into the upper and lower filter module, respectively. The housing may be e.g. of cylindrical or rectangular configuration in a portion surrounding the filter unit and merge with a lower funnel-shaped portion that is possibly followed by the collecting container at the lowest location thereof.

Feasible filtration aids are in particular rock flour (crushed rock of silt size), e.g. limestone powder, and other mineral dusts.

Upstream of the filter unit there can be arranged in addition a pre-separator stage—preferably comprising a rinsing system or a cyclone separator—which already separates coarse contaminations.

There may also be an additional filter stage—preferably comprising a depth-loading filter—arranged downstream of the filter unit. By regular examination of the downstream filter stage, failure or deterioration of the filter unit can be detected, and the filter unit possibly can be replaced. The downstream filter stage moreover prevents that uncleaned exhaust air can leave the installation.

Preferred fields of application of the filter device described are apparatus and devices in which exhaust air is created containing sticky and/or tarry foreign matter. It has turned out that the device according to the invention can be installed and is of valuable service especially in installations of one of the types indicated hereinafter:

- a device for eliminating air pollutions in a wet painting or varnishing facility or plant,
- a device for eliminating air pollutions in a dray painting or varnishing facility or plant,
- a device for eliminating air pollutions in a laser beam welding facility or plant or other welding fume extraction system,
- a device for eliminating air pollutions in flue gases, in particular in flue gases arising in combustion processes (in such combustion processes, there are frequently developed tarry or soot-like products that have to be removed from the exhaust gas as pollutions);
- a device for eliminating air pollutions in a cavity sealing facility or plant,
- a device for eliminating air pollutions in a plant for adhesively joining metal parts;
- a device for eliminating gaseous pollutions in an exhaust gas stream with addition of chemisorptive filtration aids that chemically react with the gaseous pollutions (e.g. sulfur dioxide, $SO_2$, or HCl gas contained in exhaust gas can be effectively deposited on a dry filter by addition of calcium hydroxide, $Ca(OH)_2$, as filtration aid, with the chemisorption taking place simultaneously with the removal of solid or liquid aerosols from the exhaust gas).

According to the invention, there is suggested furthermore a method of cleaning gas entraining foreign bodies in which the device described hereinbefore is utilized. This method involves in particular supplying a raw gas stream containing foreign bodies to at least one filter unit having at least one filter surface on a raw gas side, with filtration aids being supplied to the raw gas stream and/or the filter surface. Furthermore, filtration aids and/or foreign bodies attached to the filter surface are cleaned off, and a carrier fluid stream is generated such that cleaned-off filtration aids and/or foreign bodies can be held at least in part as filtration aerosol in a surrounding of the filter unit and can re-attach to a filter surface.

BRIEF DESCRIPTION OF THE DRAWINGS

The invention will be explained in more detail hereinafter by way of embodiments shown in the drawings, in which.

DETAILED DESCRIPTION

Figure 1:
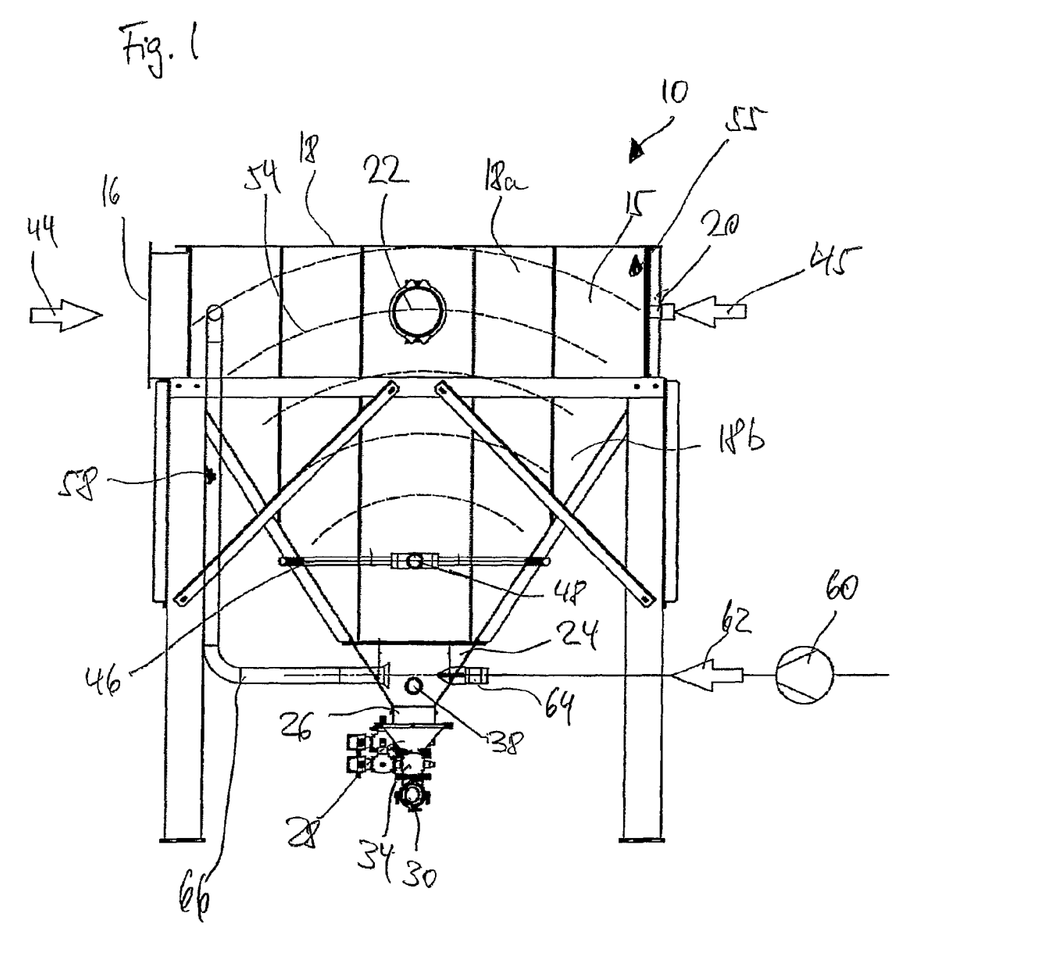
FIG. 1 shows a side view of a filter device for cleaning gas entraining foreign bodies in accordance with an embodiment.
Figure 2:
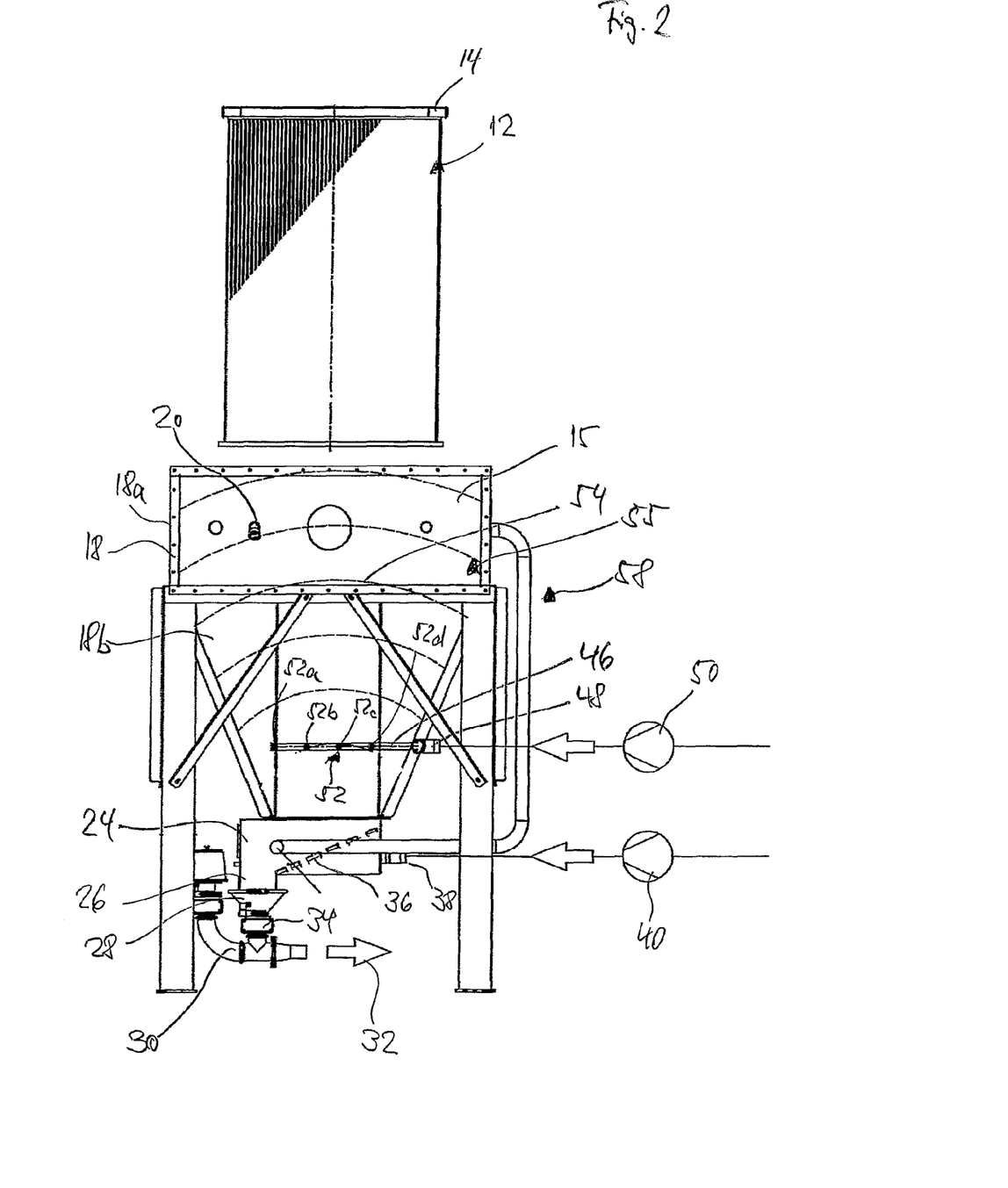
FIG. 2 shows the device of FIG. 1 in a side view rotated by 90 degrees with respect to the view of FIG. 1.

FIGS. 1 and 2 each show, in side views rotated by 90 degrees in relation to each other, a filter device 10 for cleaning gas entraining foreign bodies according to an embodiment. The device 10 comprises a filter unit 12 (not shown in FIG. 1, FIG. 2 outlines one of the filter elements 14 of filter unit 12). The filter unit 12 is mounted above a raw gas inflow opening 16 in an upper part of a housing 18, which has been omitted for clarity. The filter unit 12 comprises several filter elements 14 provided in the form of rigid-body filters and mounted to a common upper support and extending parallel to each other in vertical direction, as schematically illustrated in FIG. 2 which shows one of the filter elements 14 in the mounting location of the same.

In the lower part of the housing 18, enclosing a raw gas space 15, as illustrated in FIGS. 1 and 2, there are formed an additional inflow opening 20 as well as a flap 22 in addition to the raw gas inflow opening 16. All of these openings 16, 20, 22 are arranged substantially at the same height in an annular upper portion 18a of lower housing part 18. In a portion 18b following below said portion 18a, the housing 18 adopts the shape of a funnel with downwardly tapering side walls. Following on the bottom side of housing 18, there is provided a collecting container 24 for collecting no longer usable material before such material is discharged through a disposal opening 26 located at the lowest point of the collecting container 24 and through a disposal funnel 28 into a vacuum conveying means 30, and is disposed of, as indicated by arrow 32 in FIG. 2. Disposal funnel 28 normally is closed at its lowest location by a valve 34 and is opened briefly only when material is to be discharged from the collecting container 24. For ensuring disposal of the material that is collected in the collecting container 24 and as a rule has foreign bodies attached thereto to a very large extent and possibly resides there for relatively long periods of time, there is provided in the collecting container 24 an obliquely extending fluidizing floor 36 having air supplied thereto via a connection 38. Said connection 38 has a fan connected thereto, that is shown only schematically at 40, by means of which pressurized air is fed into fluidizing floor 36. The air stream generated in fan 40 is adjusted such that the material collecting in the collecting container 24 on the one hand is stirred such that it has good flowability and thus can be discharged easily via disposal opening 26, but that on the other hand this material cannot get back from the collecting container 24 into the housing 18 or the raw gas space 15, respectively.

The raw gas stream, schematically illustrated by arrow 44, in which foreign bodies are entrained that are to be eliminated by means of device 10, enters the raw gas space 15 enclosed by housing 18 via the raw gas inflow opening 16, with said space 15 being confined at its top side by the raw gas side of filter unit 12. The raw gas stream 44, upon entry into said raw gas space 15, is conveyed to filter unit 12. On the side of the housing 18 opposite the raw gas inflow opening 16, there is provided an additional inflow opening 20 through which filtration aids, as a rule rock flour, are fed from a supply container, not shown, into raw gas space 15. The stream of filtration aids is indicated in FIG. 1 by arrow 45.

In a lower portion of the funnel-shaped housing portion 18b, there is provided a connection 48 connected to an annular conduit 46 extending horizontally through housing 18b. Annular conduit 46 is located above collecting container 24 and in particular is always located above the material collected in collecting container 24. Connected to connection 48 is a further fan 50 that is also shown only schematically in FIG. 2. Fan 50, like fan 40, may comprise a side channel blower. In a preferred embodiment, fan 50 is operated continuously during operation of the device 10.

Annular conduit 46 has several nozzles 52*a*, 52*b*, 52*c*, 52*d* formed therein, which are illustrated schematically in FIG. 2. Via these nozzles 52*a*, 52*b*, 52*c*, 52*d*, constituting a nozzle assembly 52, pressurized air generated via fan 50 and introduced via connection 48, is issued and upon deflection by the inner walls of the funnel-shaped housing portion 18*b* forms a carrier fluid stream 54 that is directed substantially vertically upwardly. This carrier fluid stream 54 is outlined in the figures by arc-shaped curves in broken lines. The carrier fluid stream 54, starting from the nozzle assembly 52, moves upwardly at a velocity that is determined by the gas pressure generated by fan 50 and by the geometric arrangement of nozzles 52*a*, 52*b*, 52*c*, 52*s* as well as the arrangement thereof in relation to housing 18. Annular conduit 46 with nozzle assembly 52, connection 48 and fan 50 are part of a fluidized bed arrangement 55 generating the carrier fluid stream 54 in operation of fan 50.

At the height of the raw gas inflow opening 16, the carrier fluid stream 54 is united with the raw gas stream 44. This has the effect that foreign bodies entrained in the raw gas stream 44 are carried upwardly along with the carrier fluid stream 54 and thus are transported to filter unit 12. If necessary, filtration aids are introduced via the additional inflow opening 20, with the flow of filtration aids 45 being mixed as well with the carrier flow stream 54 and the filtration aids thus being entrained by the carrier fluid stream 54 and being transported upwardly towards filter unit 12. On their way to filter unit 12, these streams 54, 44 and 45 mix. This has the result that foreign bodies entrained in the raw gas stream 44 collide with the filtration aids and form agglomerations which then attach to the filter surfaces of filter unit 12.

Filter unit 12 has a pressurized-air cleaning-off unit associated therewith, which is not shown in the drawings and is located on the clean gas side of filter unit 12 above filter elements 14. In certain intervals, the pressurized-air cleaning-off unit acts on a particular filter element 14 so that the same experiences a pressure surge from its clean gas side. The pressure surge has the effect that material attached on the raw gas side of the respective filter element 14, which as described hereinbefore comprises either pure filtration aids or agglomerations of filtration aids with foreign bodies attached thereto, is detached from the filter element 14 and falls down due to its gravity.

As soon as the cleaned-off particles (as mentioned, either filtration aids or agglomerations of filtration aids with foreign bodies attached thereto), upon having been detached from filter element 14, come under the influence of the carrier fluid stream 54, they do not only experience a force in downward direction due to their gravity, but also a force in upward direction due to the upward flow of the carrier fluid. This has the effect that these particles, at least as long as they are not in excess of a certain critical mass density, do not move further downwardly, but move again upwardly until gravity and the force exerted by the carrier fluid stream 54 are balanced. The consequence is that, at a specific height covering a distance from about the height of the filter unit 12 down to the height of the raw gas inflow opening 16, a relatively stable filtration aerosol layer is formed. In this filtration aerosol layer, the filtration aids, the foreign bodies contained in the raw gas as well as the agglomerations formed by them are held suspended. This holds at least for agglomerations that are not yet fully saturated, the mass density of which has not yet become greater than the critical mass density due to too much loading thereof with foreign bodies.

The flow velocity of the carrier fluid stream 54 and/or the flow velocity of the raw gas stream 44 preferably is selected such that turbulence is established in the carrier fluid stream 54 at least as from its unification with the raw gas stream 44. The filtration aerosol layer then will remain stable in its entirety, however, the individual particles of this layer will be well mixed by the turbulence, which enhances efficient agglomeration and new coating of the filter surfaces with filtration aids.

As soon as cleaning-off of each filter element 14 of filter unit 12 has been effected, there will be a sufficient number of particles of filtration aid material in the filtration aerosol layer for effecting further efficient agglomeration with foreign bodies entrained in the raw gas stream. Supply of fresh filtration aids via the additional inflow opening 20 then may basically be dispensed with. However, such particles in device 10 that have become heavier due to the attachment of numerous foreign bodies to the filtration aid material are no longer held in the filtration aerosol layer and fall down into collecting container 24. This effect is indeed desired as such particles are no longer capable of allowing further foreign bodies to attach and thus are basically unusable for further use as filtration aid. The thus caused continuous loss of filtration aids during operation can be balanced by fresh filtration aids that are supplied via the additional inflow opening 20.

Initial operation of device 10 is best effected in that fan 50 is put into operation first, thus causing the carrier fluid stream 54 to be established. Thereafter, filtration aid is supplied via the additional inflow opening 20. This causes a stable filtration aerosol layer to be formed on the one hand and on the other hand that a first protective coating of filtration aid material is already formed on the filter surfaces of filter unit 12. Subsequently, the raw gas stream 44 is added via raw gas inflow opening 16. As soon as the pressure loss across a respective filter element 14 of filter unit 12 becomes greater during further operation than is specified for operation (or after a specific time of operation), cleaning off of this filter element 12 takes place. This provides for further material for the filtration aerosol layer. The addition of fresh filtration aids can be dispensed with at the latest as of the time when all filter elements have been cleaned off once, apart from the addition of filtration aids for compensating losses of spent filtration aids that are discharged from the filtration aerosol layer.

Device 10 comprises furthermore an injector means 58. This injector means 58 has a fan 60 feeding a pressurized air stream 62 to a low-pressure injector 64 and from there into collecting container 24. On the side of collecting container 24 opposite to the low-pressure injector 64, a low-pressure riser 66 opens into collecting container 24. The low-pressure riser 66 extends upwardly and opens into the raw gas space 15 approximately at the height of the raw gas inflow opening 16. As an alternative, the low-pressure riser 66 could open into the raw gas stream 44 also at a further upstream location.

Injector means 58 is of assistance when the device 10 is restarted after an interruption of operation. For, when device 10 is shut down and even if the filter surfaces are covered completely, the filtration aerosol layer as a rule will still contain filtration aid material that is not yet fully saturated and thus as such could still be used further. However, as soon as fan 50 is deactivated, the carrier fluid stream 54 collapses, with the result that all material in the filtration aerosol layer falls into collecting container 24 and from there actually would have to be disposed of via disposal opening 26. In this situation, the low-pressure injector means 58 permits the material collected in collecting container 24, which actually is still usable, to be withdrawn from collecting container 24 and returned to the filtration aerosol layer when device 10 is restarted. To this end, fan 50 is activated first, causing the carrier fluid stream 54 to be established. Following this, fan 40 is activated so as to stir up the material located on the floor of collecting container 24 and cause the same to enter into a fluidized state in which it can be carried out easily from collecting container 24. Thereafter, fan 60 is activated, and the material located in collecting container 24 is supplied via riser line 66 to the filtration aerosol layer. Disposal opening 26 is closed at that time. As soon as the collecting container 24 has been emptied, fan 60 can be deactivated again, and the device 10 can be operated as described hereinbefore.

As an alternative to the low-pressure injector means 58, there could also be provided a vacuum conveying means in order to withdraw the material present in collecting container 24 by suction and supply the same to the raw gas stream 44 upstream of the housing or convey the same directly to the raw gas stream 15 in the vicinity of raw gas inflow opening 16. As a further alternative, conveying could be effected in fluidized form using pressure, e.g. by means of a solid diaphragm pump.

The invention claimed is:

1. A filter device for cleaning gas entraining foreign matter, comprising:
at least one filter unit having at least one filter surface on a raw gas side of said filter unit, said filter unit configured such that a raw gas stream containing foreign matter can be supplied to the filter surface on the raw gas side, the filter device being configured to allow at least one of: (i) supplying filtration aids to the raw gas stream upstream of said filter unit, and (ii) precoating of the filter surface on the raw gas side with filtration aids, and wherein at least one of filtration aids and foreign matter attached to the filter surface can be cleaned off;
a pressurized-air cleaning-off unit configured above said filter unit on a clean gas side of said filter unit such that pressurized air from the pressurized-air cleaning-off unit is applicable to said filter unit in accordance with the counterflow principle, to remove material deposited on the raw gas side of said filter unit, and
a fluidized bed arrangement comprising a carrier fluid introduction arrangement on the raw gas side of said filter unit, the carrier fluid introduction arrangement comprising an annular conduit arranged underneath said filter unit and provided with a nozzle arrangement comprising at least one nozzle, wherein the annular conduit is adapted to be acted upon by carrier fluid such that, in operation, a carrier fluid stream, different from the raw gas stream, is established downstream of the nozzle arrangement, wherein the carrier fluid stream is directed towards said filter unit and acts counter to the force of gravity, and wherein the carrier fluid stream is adapted to at least one of: (i) holding cleaned-off agglomerates of at least one of filtration aids and foreign matter as filtration aerosol in a surrounding of said filter unit, and (ii) allowing re-attachment of such agglomerates to a filter surface.

2. The filter device according to claim 1, wherein the fluidized bed arrangement in operation forms a filtration aerosol layer extending in vertical direction from a lower limit approximately at the height of or slightly below a bottom side of said filter unit to an upper limit approximately at the height of or slightly above an upper side of said filter unit.

3. The filter device according to claim 2, wherein the filtration aerosol layer extends up to 90 cm below the bottom side of said filter unit.

4. The filter device according to claim 1, wherein the carrier fluid stream contains gas located on the raw gas side.

5. The filter device according to claim 1, wherein the carrier fluid stream comprises the raw gas stream.

6. The filter device according to claim 1, further comprising a swirler arrangement configured to generate turbulence on the raw gas side in the surrounding of said filter unit.

7. The filter device according to claim 1, wherein the carrier fluid introduction arrangement is configured for continuous operation.

8. The filter device according to claim 1, wherein the carrier fluid introduction arrangement is adapted to be controlled such that particles exceeding a predetermined mass density are no longer held suspended and drop out of the filtration aerosol layer.

9. The filter device according to claim 1, further comprising a housing defining at least one raw gas space having the raw gas side of said filter unit facing thereto, said housing having at least one raw gas inflow opening leading into the raw gas space.

10. The filter device according to claim 9, wherein the raw gas inflow opening is arranged approximately at the height of or slightly below said filter unit.

11. The filter device according to claim 9, wherein the housing has at least one additional inflow opening leading into the raw gas space, through which the filtration aids can be supplied.

12. The filter device according to claim 1, further configured such that the raw gas stream merges with the carrier fluid stream at an angle of approx. 90 degrees.

13. The filter device according to claim 1, further configured such that the raw gas stream joins the carrier fluid stream underneath said filter unit.

14. The filter device according to claim 1, further comprising a collecting container for non-reusable particles, the collecting containing being associated with the raw gas side of the filter device.

15. The filter device according to claim 14, wherein the collecting container, at a lowest location thereof, has a disposal opening through which material can be withdrawn from the collecting container.

16. The filter device according to claim 14, wherein the collecting container is arranged below a portion of the housing that is arranged underneath said filter unit, the portion of the housing having a substantially funnel-shaped configuration.

17. The filter device according to claim 14, wherein the collecting container comprises a fluidizing arrangement through which material located in the collecting container can be acted upon by gas such that the flowability of the material located in the collecting container is retained.

18. The filter device according to claim 1, further comprising a conveying structure through which material from the collecting container can be supplied to the filtration aerosol layer and/or the raw gas stream upstream of said filter unit.

19. The filter device according to claim 1, wherein said filter unit comprises at least one filter element that is in the form of a rigid-body filter.

20. The filter device according to claim 19, wherein the filter element has a base body comprising sintered material, the sintered material including sintered polyethylene particles as main constituent and wherein the base body is provided with a surface coating containing polytetrafluoroethylene particles.

21. The filter device according claim 19, wherein the filter element is formed of an arrangement of polyethylene tubes, with a filter membrane of polytetrafluoroethylene being laminated onto each of the polyethylene tubes.

22. The filter device according to claim 9, wherein the housing has at least one lateral housing opening that can be closed by a corresponding lid and is arranged at the height of said filter unit and through which the filter elements can be inserted.

23. The filter device according to claim 1, wherein the filtration aids are selected from the group consisting of rock flour and other mineral dusts.

24. The filter device according to claim 1, wherein said filter unit has a pre-separator stage arranged upstream thereof comprising a rinsing system or a cyclone separator.

25. The filter device according to claim 1, wherein said filter unit has an additional stage arranged downstream thereof comprising a depth-loading filter.

26. The filter device according to claim 1, wherein the filter device is adapted to be installed in a device for cleaning exhaust air containing sticky and/or tarry foreign matter, in at least one device of one of the types selected from the group consisting of:

a device for eliminating air pollutions in a wet painting or varnishing facility, a device for eliminating air pollutions in a dray painting or varnishing facility, a device for eliminating air pollutions in a laser beam welding plant or other welding fume extraction system, a device for eliminating pollutions in flue gases, in particular in flue gases arising in combustion processes, a device for eliminating air pollutions in a cavity sealing facility, a device for eliminating air pollutions in a plant for adhesively joining metal parts; and a device for eliminating gaseous pollutions in an exhaust gas stream with addition of chemisorptive filtration aids that chemically react with the gaseous pollutions.

27. A method of cleaning gas entraining foreign bodies, comprising:

supplying a raw gas stream containing foreign matter to at least one filter unit having at least one filter surface on a raw gas side of said filter unit, supplying filtration aids to at least one of the raw gas stream and the filter surface and cleaning off at least one of filtration aids and foreign matter attached to the filter surface according to the counterflow principle by way of a pressurized-air cleaning-off unit that is arranged above said filter unit on the clean gas side of the same; and wherein an annular conduit arranged underneath said filter unit and provided with a nozzle arrangement comprising at least one nozzles is acted upon by carrier fluid in such a way that in operation a carrier fluid stream, different from the raw gas stream, is established downstream of the nozzle arrangement, which carrier fluid stream is directed towards said filter unit and acts counter to the force of gravity, which carrier fluid stream is adapted to (i) hold agglomerates of at least one of cleaned-off filtration aids and foreign matter at least in part as filtration aerosol in a surrounding of said filter unit, and (ii) allows for re-attachment of a such agglomerates to a filter surface.

* * * * *